Feb. 12, 1929.
L. H. REED
MOTOR VEHICLE
Filed June 4, 1928
1,701,542
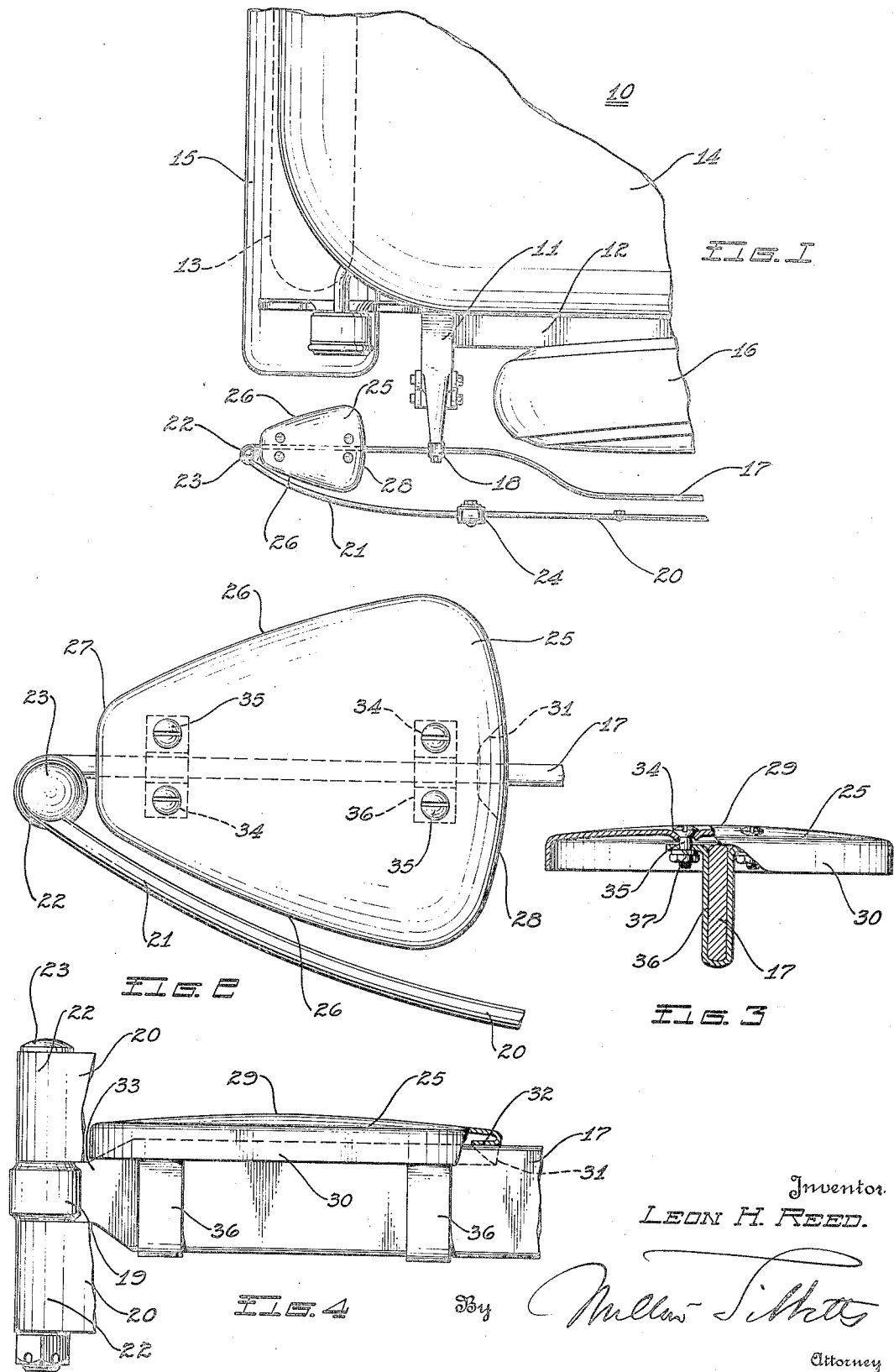
Inventor.
Leon H. Reed.
By Miller Tibbitts
Attorney Patented Feb. 12, 1929.

1,701,542

UNITED STATES PATENT OFFICE.

LEON H. REED, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed June 4, 1928. Serial No. 282,568.

This invention relates to motor vehicles and more particularly to bumpers for the protection thereof.

Bumpers for motor vehicles are generally supported horizontally on the ends of the side members of the chassis at the front and rear of the vehicle and extend transversely through the vertical planes of the wheels. Because of the position of the rear bumper extending transversely through the vertical planes of the rear wheels, small stones and other objects on the surface of the road are thrown by the wheels against the bumper from which they are deflected against the fenders and the body panels causing considerable damage to the highly finished surface thereof which gives an unsightly appearance to the vehicle.

An object of the invention is to provide means for preventing objects thrown from the surface of a road by the wheels of a vehicle from being deflected by the bumper against the body of the vehicle.

Another object of the invention is to provide a deflector adapted to be attached to the rear bumper of a motor vehicle for the protection of the vehicle against objects thrown from the surface of a road by the wheels of the vehicle.

Another object of the invention is to provide a deflector which may be easily and quickly installed and when secured in position will not work loose and rattle.

Still a further object of the invention is to provide a deflector for the purpose specified which is interchangeable from right to left and vice versa, is highly efficient in operation and yet of marked simplicity, so that its manufacture is economically facilitated.

Other objects of the invention will appear from the following description taken in connection with the drawings, which form a part of this specification, and in which:

Figure 1 is a plan view of a motor vehicle, partly broken away, illustrating the invention as applied, Figure 2 is an enlarged plan view illustrating the end of a bumper having the deflector thereon, Figure 3 is an end view of the deflector, partly broken away, the deflector being positioned on a support bar shown in section, and Figure 4 is a side elevation of the deflector, the support and impact bars of the bumper being broken away.

Referring to the drawings for more specific details of the invention, 10 represents generally a motor vehicle having a frame including side members 11 and cross members 12 supported on wheels 13. The frame supports a body 14 having secured thereto a rear fender 15 of conventional form and suitably supported on the cross bar 12 in any preferred manner is a spare wheel and tire 16.

Suitably secured on the rear end of the side members 11 is a bumper adapted to protect the vehicle against damage by collision. As shown, the bumper has a support bar 17 secured to the rear end of the side members 11, as by clamps 18, and the ends of the support bar have eyes 19. Corresponding impact bars 20 having arcuate portions 21 and eyes 22 at their ends are arranged one above the other with the eyes 22 registering with the eyes 19 in the ends of the support bars. Bolts 23 are passed through the registering eyes securing the support and impact bars together and the impact bars are secured to each other in spaced relation by suitable clamps 24 preferably equally spaced from the ends of the bumper.

The support bar 17 and the impact bars 20 are positioned transversely of the vehicle adjacent the rear ends of the fenders 15, and extend beyond the vertical plane of the wheels 13 to provide adequate protection for the fenders. Positioned on the support bar 17 in a horizontal plane intersecting the vertical plane of the wheels 13 and the fenders 15 is a deflector 25. As shown, the deflector comprises a stamping substantially in the form of an isosceles triangle, the sides 26 of which are curved to conform substantially with the contour of the curved end portions of the impact bars with the converging ends of the sides merging into a relatively short section 27 and the diverging ends merging into a curve 28 more or less semi-elliptical in character. The deflector is symmetrical with respect to its longitudinal axis, the object of which will hereinafter appear.

The deflector has a convex surface as indicated at 29 and is provided with a downwardly extending perimetral flange 30, a portion of which is bent inwardly as at 31 to provide a suitable bearing surface 32 adapted to center and maintain the deflector horizontally when positioned on the support bar 17 with that portion of the flange 30 depending from the curved portion 27, engaging a reduced portion 33 on the support bar immediately adjacent the eyes 19. This structure provides a two point bearing for the deflector on the support bar and means for positioning the deflector with precision and further supports the deflector so that the body portion thereof does not engage the support bar, thereby avoiding the possibility of rattling caused by vibration.

The general outline of the deflector is such that when the deflector is adjusted to position the perimeter thereof is sufficiently spaced from the impact bars to prevent damage to the deflector by deformation of the impact bars in ordinary usage. Then, too, since the deflector is symmetrical with respect to the longitudinal axis, it is readily reversible, that is, from left to right and vice versa. This is a particularly desirable feature since by virtue thereof a material saving in the cost of production is accomplished.

The body portion of the deflector has spaced pairs of apertures 34 so arranged that the axis of the deflector is in a plane between the apertures of each pair. These apertures are suitably countersunk to receive the heads of bolts 35, the bolts being passed through the apertures 34 and through registering apertures in the ends of clamps 36 straddling the support bar 17 and have threaded thereon nuts 37 with the usual lock washers interposed. The spaced relation of the clamps 36 to the convex body portion of the deflector serves, owing to the resilient character of the convex body portion, to maintain a constant tension on the bolts 35 due to the tendency of the clamps 36 and the body of the deflector to spring apart, thus effectively retaining the deflector in position and preventing rattling thereof when the bolts work loose to a small extent.

Although this invention has been described in connection with certain specific embodiments, the principles involved are susceptible of numerous other applications which will readily occur to persons skilled in the art. The intention is, therefore, to be limited only as indicated by the scope of the appended claims.

Having thus described the various features of my invention, what I claim as new and desire to secure by Letters Patent is:

1. In combination with a motor vehicle bumper having a support bar, a deflector having its longitudinal axis in the vertical plane of the longitudinal axis of the support bar and securing means engaging the deflector on each side of its axis.

2. In combination with a motor vehicle bumper having a support bar, a deflector symmetrical with respect to its longitudinal axis, the deflector positioned on the support bar with its longitudinal axis in the vertical plane of the longitudinal axis of the support bar and securing means on the support bar engaging the deflector on each side of its longitudinal axis.

3. In combination with a motor vehicle bumper, a deflector having a two point bearing on the bumper and means intermediate the bearing points for securing the deflector on the bumper.

4. In combination with a motor vehicle bumper, a deflector thereon, a peripheral flange on the deflector having two bearing points on the bumper and means intermediate the bearing points for clamping the flange on the bumper.

5. In combination with a motor vehicle bumper, a deflector having a body portion symmetrical with respect to its longitudinal axis, a flange on the body portion having two bearing points on the bumper and means intermediate the bearing points for clamping the flange on the bumper.

6. In combination with a motor vehicle bumper having a support bar, a deflector having a convex body portion symmetrical with respect to its longitudinal axis, a peripheral flange on the body portion engaging the support bar and securing means on the support bar engaging the body portion on each side of its longitudinal axis.

7. In combination with a motor vehicle bumper having support and impact bars, a deflector symmetrical with respect to its longitudinal axis, a flange on the deflector having two bearing points on the support bar and clamps on the support bar secured to the deflector on each side of its longitudinal axis for clamping the flange on the support bar.

8. In combination with a motor vehicle bumper having support and impact bars, a deflector positioned on the support bar in spaced relation to the impact bar, and means for securing the deflector on the support bar.

9. In combination with a motor vehicle bumper having a support bar and an impact bar with a curved portion, a deflector positioned on the support bar in spaced relation with the curved portion of the impact bar and means for clamping the deflector on the support bar.

10. In combination with a motor vehicle bumper having support and impact bars with curved portions, a deflector symmetrical with respect to its longitudinal axis positioned on the support bar in spaced relation to the curved portion of the impact bar, a guide for positioning the deflector on the support bar and securing means engaging the deflector on each side of its longitudinal axis.

11. In combination with a motor vehicle having a rear fender and a bumper having spaced support and impact bars arranged horizontally in the rear of and projecting beyond the fender, a deflector symmetrical with respect to its longitudinal axis positioned on the support bar in the perpendicular plane of the fender, the deflector having spaced bearing points on the support bar and means intermediate the bearing points for securing the deflector on the support bar.

12. In combination with a motor vehicle having a rear fender and a bumper having spaced support and impact bars arranged horizontally in the rear of and projecting beyond the fender, a deflector symmetrical with respect to its longitudinal axis positioned on the support bar in the perpendicular plane of the fender in spaced relation to the impact bars with its axis in the plane of the longitudinal axis of the support bar and securing means engaging the deflector on each side of its axis.

In testimony whereof I affix my signature.

LEON H. REED.